Patented Feb. 13, 1940

2,190,444

UNITED STATES PATENT OFFICE 2,190,444

DERIVATIVES OF 2.6-DIHYDROXYPYRIDINE-4-CARBOXYLIC ACID AND A METHOD OF MAKING THE SAME

Max Dohrn, Berlin-Charlottenburg, and Hans Nahme, Berlin-Zehlendorf, Germany

No Drawing. Application March 19, 1937, Serial No. 131,784. In Germany March 23, 1936

13 Claims. (Cl. 260—295)

This invention relates to derivatives of 2.6-dihydroxypyridine-4-carboxylic acid and a method of making the same.

In accordance with the present invention compounds of the general formula:

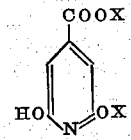

or the tautomeric form

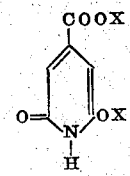

in which X indicates substituted or non-substituted hydrocarbon residues, such as alkyl, aralkyl or cycloalkyl residues, can be obtained. The process of manufacture of this invention comprises the etherification or etherification and esterification of 2.6-dihydroxy-pyridine-4-carboxylic acid or its esters by reaction with compounds containing alcohol groups. The reaction is induced and accelerated by the addition, as a condensing agent, of thionyl chloride, sulphuric acid, perchloric acid, phosphoric acid, furthermore organic sulphonic acids, such as sulphoacetic acid, methionic acid, benzene or toluene sulphonic acids, naphthalene sulphonic acid or the like. The ether-esters thus formed are very easily soluble in most organic solvents and due to this property can be separated by known processes from small quantities of unchanged starting material and the simultaneously formed, non-etherified esters. The free ether-acids are obtained in a simple manner by saponification of these ether-esters. It is stated in the literature in Beilstein's Handbook of Organic Chemistry, vol. 22, 4th edition (1935), page 257, that on treating citrazinic acid with methanol in the presence of a specific condensing agent, namely hydrochloric acid, 2.6-dihydroxypyridine-4-carboxylic acid methyl ester is formed. However, it is not possible to simultaneously succeed in etherifying one hydroxyl group by means of this agent. Hence, in contrast to the known behavior of hydrochloric acid the claimed condensing agents have a very specific and new effect upon the present starting materials due to their etherifying action.

The mono-ethers of 2.6-dihydroxy-pyridine-4-carboxylic acids and their esters obtained according to the present process constitute a class of new pyridine derivatives which find application as intermediate products for the manufacture of pharmaceutical preparations. Such preparations containing in the molecule pyridine or quinoline carboxylic acid compounds are known. For instance, analogous products are described in applicants' Patents Nos. 2,138,628 and 2,064,297.

The following examples illustrate the invention the parts being by weight:

Example 1

To 100 parts of butyl alcohol and 15.5 parts of 2.6-dihydroxy-pyridine-4-carboxylic acid are added about 30 parts of thionyl chloride. This mixture is then heated on the water bath until the acid is completely dissolved. The thionyl chloride and the excess butyl alcohol are thereupon distilled off and the residue extracted by shaking with sodium carbonate solution and ether. The ether solution contains the 2-hydroxy-6-butoxy-pyridine-4-carboxylic acid butyl ester, which after distilling off the ether and recrystallising from petrol-ether melts at 60 to 61° C. On saponification is produced the free acid of M. P. 205° C.

Example 2

23.7 parts of 2.6-dihydroxy-pyridine-4-carboxylic acid cyclohexyl ester of M. P. 218° C. are boiled in 75 parts of cyclohexanol with 10 parts of concentrated sulphuric acid for about 1 hour under a reflux condenser, whereupon with a descending condenser a portion of the reaction mixture, consisting of cyclohexanol and water is distilled off. The contents of the flask after cooling are washed several times with water and the excess of alcohol distilled off with steam. As in Example 1 the ether-ester is then separated with sodium carbonate and ether. The ether soluble 2-hydroxy-6-cyclohexyloxy-pyridine-4-carboxylic acid cyclohexyl ester, after recrystallisation from petrol-ether melts at 97° C. and the free acid obtained therefrom by saponification at 223° C.

Example 3

When 15.5 parts of 2.6-dihydroxy-pyridine-4-carboxylic acid are heated with about 100 parts of isoamyl alcohol and 2 parts of perchloric acid to 130° C. under a reflux condenser with the passage of a current of indifferent gas, for example, carbon dioxide or nitrogen in such a manner that at a very slow rate a mixture of isoamyl alcohol and water distils off, then practically the whole of the acid is converted into the 2-hydroxy-6-isoamyloxy-pyridine-4-carboxylic acid isoamyl ester which is isolated from the reaction mixture, for example, in the manner set forth in Example 2. M. P. 82° C. The corresponding free acid melts at 258° C. with decomposition.

In the same manner 2-hydroxy-6-ethoxy-pyridine-4-carboxylic acid ethyl ester is produced which exhibits the melting point 67° C.

Of course, many changes and variations in the reaction conditions and the like may be made by those skilled in the art in accordance with the principles set forth herein and in the claims annexed hereto.

What we claim is:

1. Process for the manufacture of mono-ethers of 2.6-dihydroxy-pyridine-4-carboxylic acid compounds, comprising reacting a 2.6-dihydroxy-pyridine-4-carboxylic compound with a compound containing an alcoholic group which is the residue of a monobasic alcohol taken from the class consisting of saturated aliphatic alcohols and cyclic alcohols saturated in the alcohol radical in the presence of an etherifying agent.

2. Method according to claim 1 wherein the etherifying agent is selected from the group of compounds consisting of thionyl chloride, sulphuric acid, perchloric acid, phosphoric acid, and organic sulphonic acids.

3. Method according to claim 1 wherein a 2.6-dihydroxy-pyridine-4-carboxylic acid ester is used as starting material.

4. Method according to claim 1 wherein 2.6-dihydroxy-pyridine-4-carboxylic acid is used as starting material.

5. A method for the manufacture of mono-ethers of 2.6-dihydroxy-pyridine-4-carboxylic acid wherein 2.6-dihydroxy-pyridine-4-carboxylic acid is etherified with an alcoholic compound which is the residue of a monobasic alcohol taken from the class consisting of saturated aliphatic alcohols and cyclic alcohols saturated in the alcohol radical in the presence of an etherifying agent whereupon the ester formed thereby is subsequently saponified.

6. A mono-ether of a 2.6-dihydroxy-pyridine-4-carboxylic acid compound and a monobasic alcohol taken from the class consisting of saturated aliphatic alcohols and cyclic alcohols saturated in the alcohol radical.

7. A mono-ether of 2.6-dihydroxy-pyridine-4-carboxylic acid of the structural formula

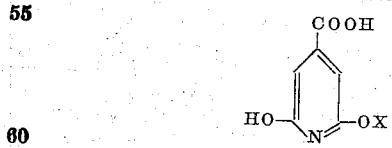

wherein X represents a hydrocarbon radical which is the residue of a monobasic alcohol taken from the class consisting of saturated aliphatic alcohols and cyclic alcohols saturated in the alcohol radical.

8. A mono-ether of a 2.6-dihydroxy-pyridine-4-carboxylic acid ester of the following structural formula

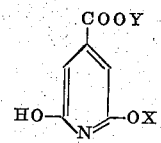

wherein X and Y represent hydrocarbon radicals which is the residue of a monobasic alcohol taken from the class consisting of saturated aliphatic alcohols and cyclic alcohols saturated in the alcohol radical.

9. 2-hydroxy-6-butoxy-pyridine-4-carboxylic acid butyl ester having the melting point 60–61° C. and yielding, on saponification, an acid of the melting point 252° C.

10. 2-hydroxy-6-cyclohexyl-oxypyridine-4-carboxylic acid cyclohexyl ester having the melting point 97° C. and yielding, on saponification, an acid of the melting point 223° C.

11. 2-hydroxy-6-isoamyl-oxypyridine-4-carboxylic acid isoamyl ester having the melting point of 82° C. and yielding, on saponification, an acid of the melting point 258° C. (with decomposition).

12. A mono-ether of 2.6-dihydroxy-pyridine-4-carboxylic acid of the structural formula

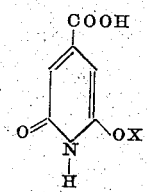

wherein X represents a hydrocarbon radical which is the residue of a monobasic alcohol taken from the class consisting of saturated aliphatic alcohols and cyclic alcohols saturated in the alcohol radical.

13. A mono-ether of 2.6-dihydroxy-pyridine-4-carboxylic acid ester of the structural formula

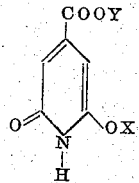

wherein X and Y each represents a hydrocarbon radical which is the residue of a monobasic alcohol taken from the class consisting of saturated aliphatic alcohols and cyclic alcohols saturated in the alcohol radical.

MAX DOHRN.
HANS NAHME.